United States Patent
Watanabe et al.

(10) Patent No.: US 6,697,134 B2
(45) Date of Patent: Feb. 24, 2004

(54) REFLECTIVE-TYPE LIQUID CRYSTAL DISPLAY AND METHOD FOR MANUFACTURING SAME

(75) Inventors: Takahiko Watanabe, Tokyo (JP); Daisuke Inoue, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/058,092

(22) Filed: Jan. 29, 2002

(65) Prior Publication Data

US 2002/0135716 A1 Sep. 26, 2002

(30) Foreign Application Priority Data

Jan. 30, 2001 (JP) ........................................ 2001-022485

(51) Int. Cl.[7] .............................................. G02F 1/1337
(52) U.S. Cl. ........................... 349/102; 349/99; 349/96; 349/117; 349/76
(58) Field of Search ................................ 349/102, 103, 349/99, 101, 117, 123, 76, 96

(56) References Cited

U.S. PATENT DOCUMENTS 6,295,109 B1 * 9/2001 Kubo et al. .................. 349/119
6,346,578 B2 * 2/2002 Arakawa ..................... 525/210

FOREIGN PATENT DOCUMENTS

| JP | 07-104320 | * 4/1995 |
| JP | 11-109335 | 4/1999 |
| JP | 2000-171788 | 6/2000 |
| JP | 3095005 | 8/2000 |
| JP | 2000-321426 | 11/2000 |

OTHER PUBLICATIONS

Lev Mikhaylovich Blinov, Electro–Optical and Magneto–Optical Properties of Liquid Crystals, 1983 by John Wiley & Sons, papes 50, 51, and 56.*

Liquid Crystals Applications and Uses, vol. 1, pp. 105 and 105, edited by Birenda Bahadur, published by World Scientific.*

Japanese Office Action dated Feb. 4, 2003, with partial English Translation.

* cited by examiner

Primary Examiner—Robert H. Kim
Assistant Examiner—Thoi V. Duong
(74) Attorney, Agent, or Firm—McGinn & Gibb, PLLC

(57) ABSTRACT

A reflective-type liquid crystal display is configured so that a liquid crystal is sandwiched between a Thin Film Transistor (TFT) substrate and a facing substrate. A polarizer is formed on a side opposite to a side being in contact with the liquid crystal on a second transparent insulating substrate with a layer-stacke ¼ wavelength plate constructed by combining a ½ wavelength phase difference film with a ¼ wavelength phase difference film. Both films are made from a norbornene polymer and are sandwiched between the polarizer and second transparent insulating substrate. A permittivity anisotropy of the liquid crystal is set to be about 6 or more.

12 Claims, 5 Drawing Sheets

REFLECTIVE-TYPE LIQUID CRYSTAL DISPLAY AND METHOD FOR MANUFACTURING SAME

BACKGROUND OF THE INVENTION

1. Field of the Invention

The present invention relates to a reflective-type liquid crystal display (LCD) and a method for manufacturing a same and more particularly to the reflective-type LCD having a layer-stacked type ¼ wavelength plate formed by combining a ½ wavelength phase difference film with a ¼ wavelength phase difference film placed on one side opposite to another side being in contact with a liquid crystal in a facing substrate on the obverse side of a display and opposing to a thin film transistor (TFT) substrate, and to the method for manufacturing the above reflective-type LCD.

The present application claims priority of Japanese Patent Application No.2001-022485 filed on Jan. 30, 2001, which is hereby incorporated by reference.

2. Description of the Related Art

An LCD is widely used as a display unit for a variety of information devices or a like. Such the LCD is basically configured so that a liquid crystal is sandwiched between a thin film transistor (TFT) substrate on which a TFT operating as a switching element adapted to drive the liquid crystal and which serves as a liquid crystal driving element forming substrate is formed and a facing substrate placed so as to be opposed to the TFT substrate. The LCD is broadly classified into two types, one type being a transmission-type LCD in which a desired display is achieved by observing, from a side of the facing substrate, light incident on the liquid crystal from a side of the TFT substrate and another being a reflective-type LCD in which a desired display is achieved by having light incident on the liquid crystal from the side of the facing substrate reflect on the side of the TFT substrate and by causing the light to be emitted from the side of the facing substrate.

When the transmission-type LCD is compared with the reflective-type LCD, the former is inferior, in a point of reduction in power consumption, to the latter, since the former requires a light source such as a backlight to have light enter the liquid crystal from the side of the TFT substrate and also since a ratio of the power consumption of the entire LCD to that of the light source is as large as several ten percent. Therefore, in applications in which reduction in the power consumption is required, in particular, the reflective-type LCD is mainly employed.

However, the reflective-type LCD configured without use of a polarizer on the side of the facing substrate has a shortcoming in that, an actual value of retardation of a phase difference film placed on the side of the liquid crystal or on the side of the facing substrate changes due to a shift in a viewing angle when a display is observed from the side of the facing substrate and, as a result, a yellowish glare develops on the display, causing discomfort when viewing to users.

In an attempt to solve the above problem, a reflective-type LCD is disclosed, for example, in Japanese Patent No.3095005. The disclosed reflective-type LCD includes, as shown in FIG. 7, a TFT substrate 101 on which a TFT (not shown) operating as a driving element to drive a liquid crystal is formed, a facing substrate 102, and a liquid crystal 103 sandwiched between the TFT substrate 101 and the facing substrate 102.

The TFT substrate 101 has a first transparent insulating substrate 104 made up of glass or a like, on which the TFT (not shown) is formed on the side of the liquid crystal 103, a reflective electrode 105 formed on the side of the liquid crystal 103 on the first transparent insulating substrate 104 and operating as a pixel electrode and also serving as a reflective plate and a first oriented film 106 formed in a manner so as to cover the reflective electrode 105 and to be in contact with the liquid crystal 103. The facing substrate 102 includes a second transparent insulating substrate 108 made up of glass or a like, a polarizer 109 formed on a side opposite to a side being in contact with the liquid crystal 103 on the second transparent insulating substrate 108, a layer-stacked type ¼ wavelength plate 110 formed between the polarizer 109 and the second transparent insulating substrate 108 and constructed by combining a ½ wavelength phase difference film 111 with a ¼ wavelength phase difference film 112, both being made from a polycarbonate polymer or a polysulfone polymer, a common electrode 113 on a side of the liquid crystal 103 on the second transparent insulating substrate 108, and a second oriented film 114 formed in a manner so as to cover the common electrode 113 and to be in contact with the liquid crystal 103. Moreover, as the liquid crystal 103, a Twisted Nematic (TN) type liquid crystal is used.

Here, a twisted direction of the liquid crystal 103 occurring when the liquid crystal 103 is traced from the side of the facing substrate 102 to the side of the TFT substrate 101 relative to an oriented direction on the side of the facing substrate 102 on the liquid crystal 103 is defined as being "positive", the polarizer 109 is formed so that an angle "α" formed by its polarized light absorbing axis and by the oriented direction is set to be within a range of 5 degrees to 35 degrees, the ½ wavelength phase difference film 111 is placed so that an angle "β" formed by its optical axis and by the oriented direction is set to be within a range of −15 degrees to 15 degrees and the ¼ wavelength phase difference film 112 is placed so that an angle "γ" formed by its optical axis and by the oriented direction is set to be within a range of −75 degrees to −45 degrees (refer to FIG. 2). Moreover, a twisted angle of the liquid crystal 103 employed in the example is set to be within a range of 66 degrees to 74 degrees and a product "Δ nd" of a refractive index anisotropy (angle) of the liquid crystal 103 and a thickness of a layer of the liquid crystal 103 is set to be within a range of 0.21 μm to 0.31 μm.

In the conventional reflective-type LCD having configurations described above, since a change in retardation caused by a shift in a viewing angle of the liquid crystal 103 and a change in retardation caused by a shift in viewing angles of the phase difference films 111 and 112 can totally cancel each other out, development of unwanted colors on a display due to the change in the viewing angle can be resolved.

However, the conventional reflective-type LCD has another problem. That is, since the conventional reflective-type LCD uses, as the phase difference film to be formed on the side of the facing substrate 102, a material exhibiting great wavelength dispersion in anisotropy of the refractive index in a visible light region, other colors develop at the same time when a black color is displayed. In the conventional reflective-type LCD, a polycarbonate polymer or polysulfone polymer is used as the ½ wavelength phase difference film 111 and as the ¼ wavelength phase difference film 112 both making up the layer stacked-type ¼ wavelength plate 110 placed on a side opposite to a side being in contact with the liquid crystal 103 in the facing substrate 102, however, since these materials exhibit great wavelength dispersion in anisotropy of the refractive index, other colors develop at the same time when a black color is displayed.

FIG. 3 is a diagram explaining the wavelength dispersion in anisotropy of the refractive index occurring when the ½ wavelength phase difference film 111 and ¼ wavelength phase difference film 112 both being made from the polycarbonate polymer are used in the conventional reflective-type LCD, in which a ratio of the wavelength dispersion is plotted as ordinate and a wavelength of light in a visible range as abscissa. The degree of the wavelength dispersion is indicated by a ratio of the refractive index anisotropy "$\Delta n\ (\lambda)$" in an arbitrary wavelength "$\lambda$" to a refractive index anisotropy "$\Delta n\ (550)$" in a reference wavelength (550 nm) in a green color light. Moreover, in FIG. 3, a comparison is made in the wavelength dispersion in anisotropy of the refractive index between the conventional reflective-type LCD and a reflective-type LCD of the present invention described later. A characteristic curve "a" indicates a characteristic occurring when the polycarbonate polymer is used as a material for each of the phase difference films 111 and 112 (conventional example). A characteristic curve "b" indicates a characteristic occurring in the case of an embodiment of the present invention described later. Moreover, Tables 1 and 2 show comparisons in the ratio of the wavelength dispersion corresponding to an arbitrary wavelength "$\lambda$" between the polycarbonate polymer and a norbornene polymer Arton™ (trade name used by JSR Corporation, Japan, to be described later in the embodiment of the present invention). For example, in Table 1, when the polycarbonate polymer is used, the ratio of the wavelength dispersion corresponding to the wavelength of 500 nm is 1.016.

TABLE 1

| | | Wavelength $\lambda$ (nm) | | | |
|---|---|---|---|---|---|
| | | 400 | 450 | 500 | 550 |
| Wavelength dispersion ratio | Polycarbonate | 1.064 | 1.035 | 1.016 | 1.000 |
| | Arton | 1.028 | 1.015 | 1.006 | 1.000 |

Ratio of wavelength dispersion = $\Delta n\ (\lambda)/\Delta n\ (550)$

TABLE 2

| | | Wavelength $\lambda$ (nm) | | | |
|---|---|---|---|---|---|
| | | 600 | 650 | 700 | 750 |
| Wavelength dispersion ratio | Polycarbonate | 0.990 | 0.979 | 0.972 | 0.967 |
| | Arton | 0.997 | 0.994 | 0.991 | 0.988 |

As is apparent from FIG. 3 and Tables 1 and 2, the characteristic curve "a" shows that the shorter the wavelength, the larger the ratio of the wavelength dispersion and the greater the wavelength dispersion in anisotropy of the refractive index. This indicates that, since the retardation becomes large in a region of a blue color having a wavelength of about 430 nm, when a black color is to be displayed, a blue color light leaks and the blue color develops in the display. Therefore, when the black color is to be displayed, the black color cannot be faithfully displayed, causing unnatural display.

Moreover, FIG. 4 shows an XY chromaticity diagram in the conventional reflective-type LCD in which a region indicated by dashed lines is a chromaticity region "a" surrounded by a red (R), green (G), and blue (B) colors. Points "BL" indicate coordinates for the black color. Here, a mark "■" shows the characteristic occurring when the polycarbonate polymer is used as the material for each of the phase difference films 111 and 112 (in the conventional example) and a mark "●" shows the characteristic occurring in the case of the embodiment of the present invention. As is apparent from FIG. 4, in the conventional example, an area of the chromaticity region "a" is relatively reduced. Moreover, in the conventional example, a value of the black color in an "x" coordinate is as relatively small as about 0.218 and a value of the black color in a "y" coordinate is also as relatively small as 0.240. For the reasons described above, in the conventional reflective-type LCD, a bluish black color develops inevitably in the display.

Moreover, another problem is that, in the conventional reflective-type LCD, since the twisted angle of the liquid crystal is set so as to be smaller than that of an ordinary TN liquid crystal, it is difficult to easily obtain high contrast. That is, in the conventional reflective-type LCD, as described above, the twisted angle of the liquid crystal is set to be within a range of 66 degrees to 74 degrees and the value is smaller than that of the ordinary TN liquid crystal being about 90 degrees, which makes it difficult for the liquid crystal to fully rise. In the widely-used normally-white type reflective-type LCD, it is ideal that the liquid crystal fully rises when the black color is displayed and the retardation is near to "0" (zero). Therefore, if the liquid crystal does not rise fully, since the retardation exhibited by the liquid crystal causes a phase of light passing through the liquid crystal to be changed, resulting in a rise in luminance of a black color, contrast becomes low.

To solve this problem, a method is available in which the driving voltage is increased to have sufficient contrast in the reflective-type LCD, however, this method causes the increase in power consumption and interferes with the reduction in power consumption.

SUMMARY OF THE INVENTION

In view of the above, it is an object of the present invention to provide a reflective-type LCD and a method for manufacturing the same which are capable of preventing development of an unwanted color on a display when a black color is displayed and of stably achieving high contrast.

According to a first aspect of the present invention, there is provided a reflective-type LCD for obtaining a desired display including:

a liquid crystal;

a liquid crystal driving element forming substrate;

a facing substrate;

wherein the liquid crystal is formed in a manner to be sandwiched between the liquid crystal driving element forming substrate and the facing substrate, wherein light incident on the liquid crystal from a side of the facing substrate is reflected on a side of the liquid crystal driving element forming substrate and is emitted from a side of the facing substrate so as to be observed, wherein the liquid crystal driving element forming substrate has an insulating substrate, a liquid crystal driving element formed on a side of the liquid crystal on the insulating substrate, a reflective electrode formed on the liquid crystal driving element, and a first oriented film formed in a manner to cover the reflective electrode, wherein the facing substrate has a transparent insulating substrate, a common electrode constructed of a transparent conductor formed on a side of the liquid crystal on the transparent insulating substrate, a second oriented film formed in a manner so as to cover the common electrode, a polarizer formed on a side opposite to a side being in contact with the liquid crystal on the transparent insulating substrate, and a layer-stacked type ¼ wavelength plate constructed by combining a ½ wavelength phase difference film with a ¼ wavelength phase difference film, both being made from a norbornene polymer, formed between the polarizer and the transparent insulating substrate; and wherein a twisted direction of the liquid crystal occurring when the liquid crystal is traced from a side of the facing substrate to a side of the liquid crystal driving element forming substrate relative to an oriented direction, which serves as a reference of an angle to be formed, on a side of the facing substrate on the liquid crystal is defined as being "positive" and an angle "α" formed by a light absorbing axis of the polarizer and by the oriented direction is set to be within a range of 31 degrees to 41 degrees, an angle "β" formed by an optical axis of the ½ wavelength phase difference film and by the oriented direction is set to be within a range of 17 degrees to 27 degrees, and an angle "γ" formed by an optical axis of the ¼ wavelength phase difference film and by the oriented direction is set to be within a range of −34 degrees to −24 degrees and permitivity anisotropy of the liquid crystal is set to be about 6 degrees or more.

In the foregoing first aspect, a preferable mode is one wherein the permitivity anisotropy of the liquid crystal is set to be within a range of 6 to 14.

Also, a preferable mode is one wherein the twisted angle of the liquid crystal is set to be from 66 degrees to 74 degrees and a product of anisotropy of refractive index of the liquid crystal and a thickness of a layer of the liquid crystal is set to be within a range of 0.21 μm to 0.31 μm.

Also, a preferable mode is one wherein the ½ wavelength phase difference film and the ¼ wavelength phase difference film are made from a material exhibiting small wavelength dispersion in anisotropy of refractive index in a visible light region.

Also, a preferable mode is one wherein the reflective electrode is formed so as to have bumps and dips on its surface.

In addition, a preferable mode is one wherein the norbornene polymer includes Arton™.

According to a second aspect of the present invention, there is provided a method for manufacturing a reflective-type LCD for obtaining a desired display by forming a liquid crystal between a liquid crystal driving element forming substrate and a facing substrate and by causing light incident on the liquid crystal from a side of the facing substrate to be reflected on a side of the liquid crystal driving element forming substrate and to be emitted from a side of the facing substrate so as to be observed, the method including:

a process of forming the liquid crystal driving element forming substrate including a liquid crystal driving element, a reflective electrode, and a first oriented film formed respectively on an insulating substrate;

a process of forming the facing substrate in which a common electrode made up of a transparent conductor and a second oriented film on a side opposite to the insulating substrate on a transparent insulating substrate are provided;

a process of injecting the liquid crystal between the liquid crystal driving element forming substrate and the facing substrate so that the liquid crystal comes into contact with the first and second oriented films and causing the liquid crystal to be oriented, in accordance with a rubbing angle formed in advance on the first and second oriented films, so that a twisted angle is set to be within a range of 66 degrees to 74 degrees and that a product of anisotropy of refractive index of the liquid crystal and a thickness of a layer of the liquid crystal is set to be within a range of 0.21 μm to 0.31 μm; and a process of forming a polarizer on a side opposite to a side being in contact with the liquid crystal on the facing substrate with a layer-stacked type ¼ wavelength plate constructed by combining a ½ wavelength phase difference film and a ¼ wavelength phase difference film, both including a norbornene polymer.

In the foregoing second aspect, a preferable mode wherein, in the liquid crystal injecting process, the liquid crystal is injected in a manner that a twisted direction of the liquid crystal occurring when the liquid crystal is traced from a side of the facing substrate to a side of the liquid crystal driving element forming substrate relative to an oriented direction, which serves as a reference of an angle to be formed, on a side of the facing substrate on the liquid crystal is defined as being "positive" and an angle "α" formed by a light absorbing axis of the polarizer and by the oriented direction is set to be within a range of 31 degrees to 41 degrees, an angle "β" formed by an optical axis of the ½ wavelength phase difference film and by the oriented direction is set to be within a range of 17 degrees to 27 degrees, and an angle "γ" formed by an optical axis of the ¼ wavelength phase difference film and by the oriented direction is set to be within a range of −34 degrees to −24 degrees and permitivity anisotropy of the liquid crystal is set to be about 6 degrees or more.

Another preferable mode is one wherein the liquid crystal having permitivity anisotropy of being within a range of 6 to 14 is used.

Still another preferable mode is one wherein in the polarizer forming process, as said norbornene polymer, Arton™ is used.

With the above configuration, since the liquid crystal is sandwiched between the TFT substrate and the facing substrate, since the polarizer is formed on the side opposite to the side being in contact with the liquid crystal on the second transparent insulating substrate with the layer-stacked ¼ wavelength plate constructed by combining the ½ wavelength phase difference film with the ¼ wavelength phase difference film both being made from a norbornene polymer, being sandwiched between the polarizer and the second transparent insulating substrate, and since the permitivity anisotropy of the liquid crystal is set to be about 6 degrees or more, the wavelength dispersion in anisotropy of the refractive index in a visible light region can be made smaller and the contrast can be made higher without causing an increase of the driving voltage.

With another configuration, by a combination of well-known processes, without the use of additional special processes, the reflective-type LCD can be manufactured and, therefore, no rise in costs occurs. Moreover, development of unwanted colors when a black color is displayed can be avoided and high contrast can be stably obtained in the display.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 1:
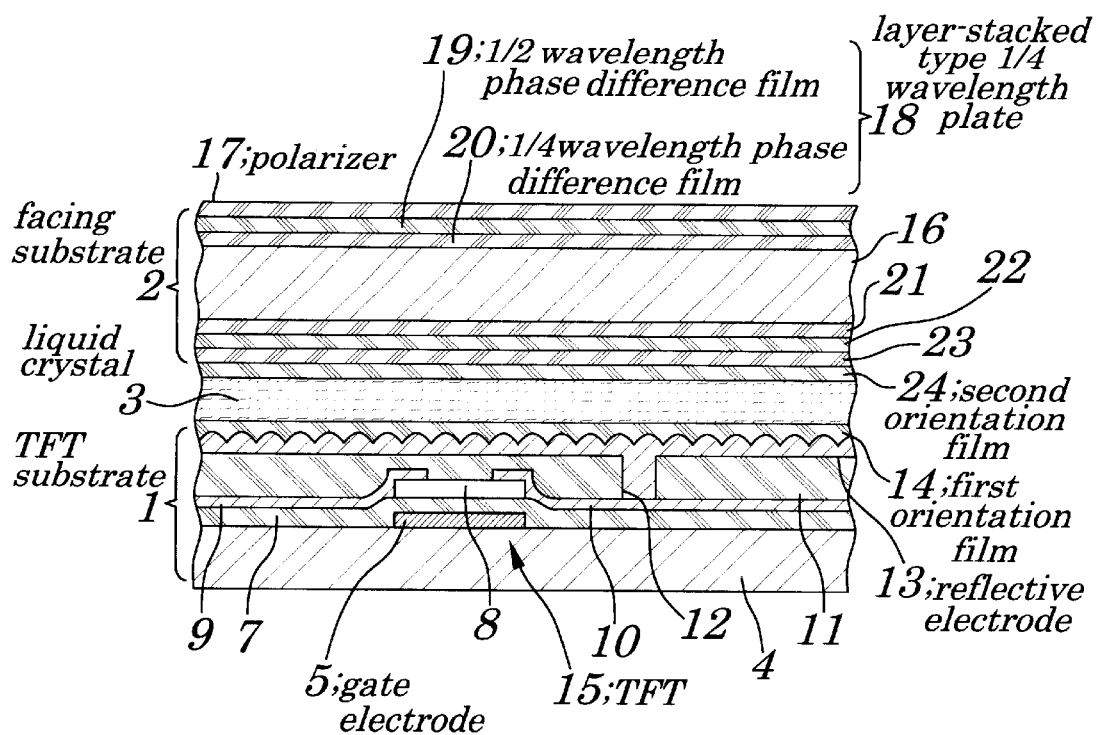
FIG. 1 is a cross-sectional view showing configurations of a reflective-type LCD according to an embodiment of the present invention.
Figure 2:
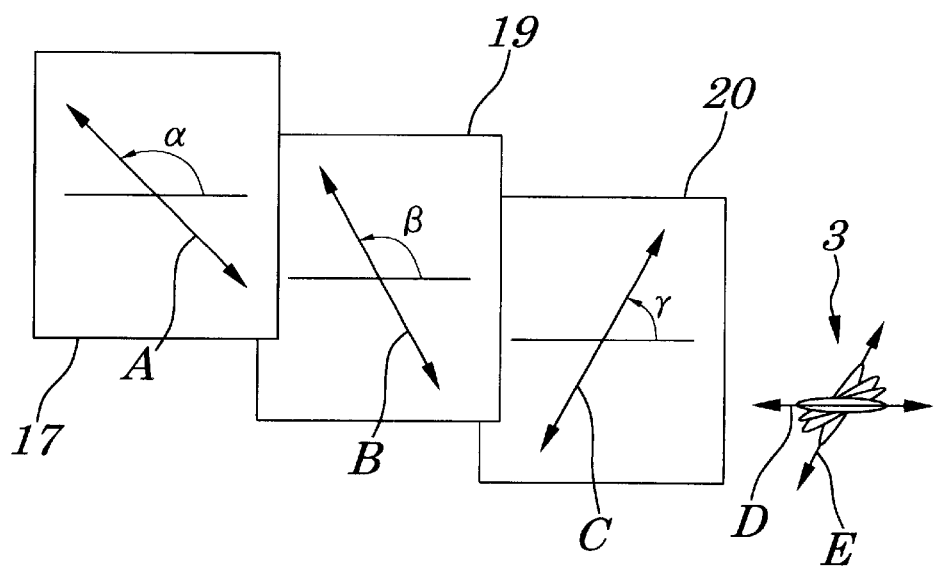
FIG. 2 is a schematic diagram illustrating an orientation state of a liquid crystal and angles formed by placement of a polarizer, ½ wavelength phase difference film and ¼ wavelength phase difference film in the reflective-type LCD of FIG. 1.
Figure 3:
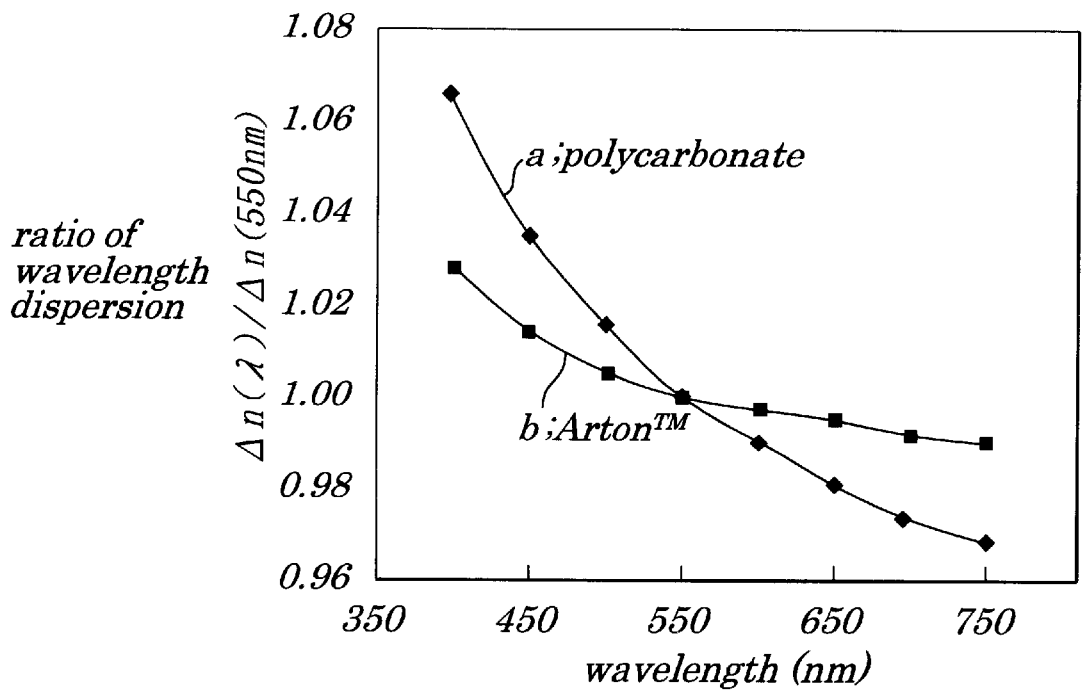
FIG. 3 is a diagram explaining a result from comparison in effects between the reflective-type LCD of the embodiment and a conventional reflective-type LCD.
Figure 4:
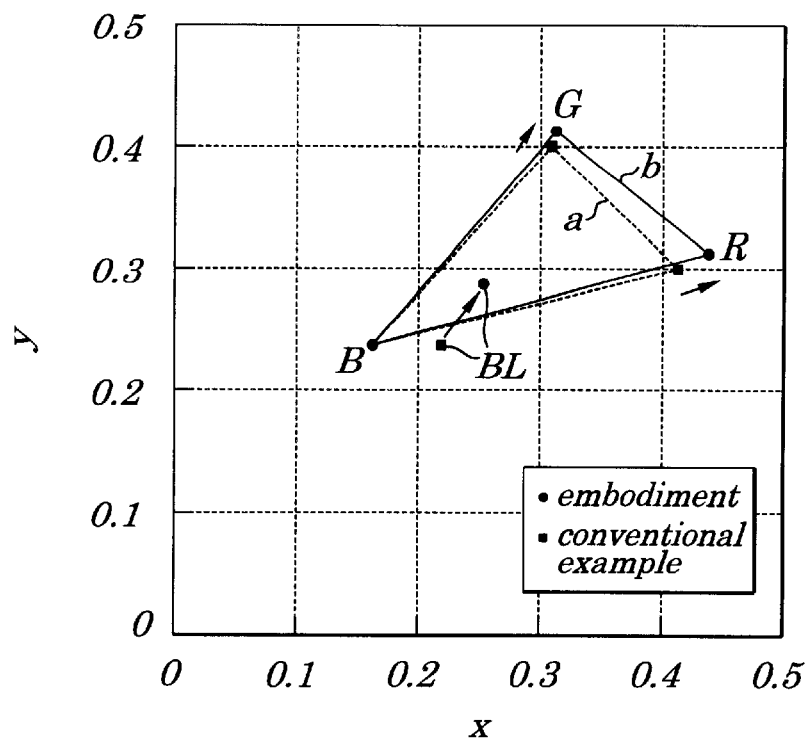
FIG. 4 is a diagram explaining a result from comparison in effects between the reflective-type LCD and the conventional reflective-type LCD.
Figure 5:
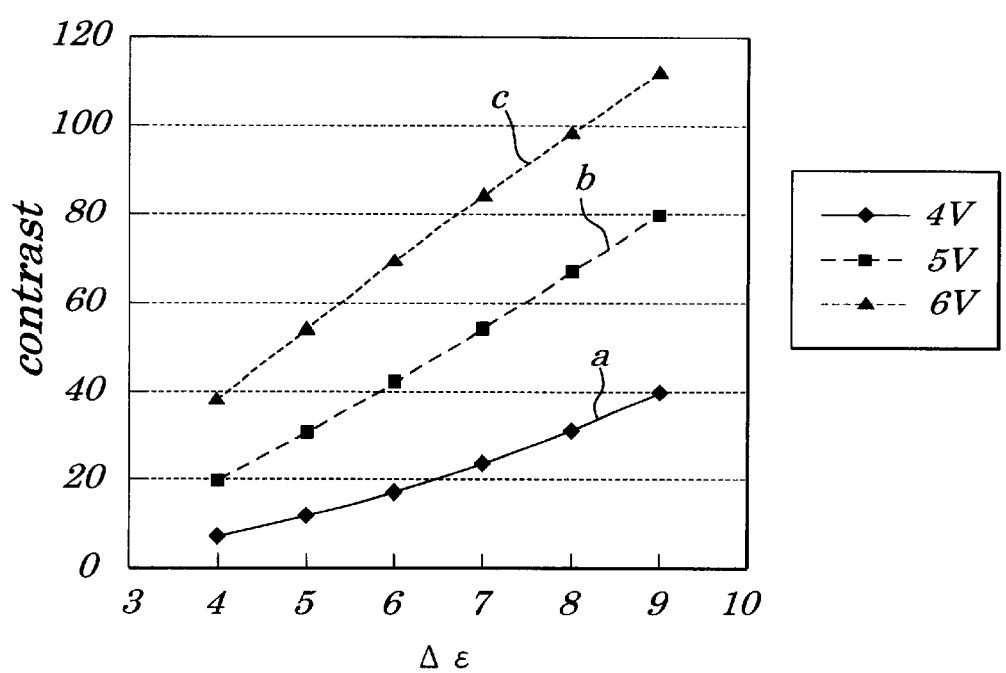
FIG. 5 is a diagram explaining effects achieved in the reflective-type LCD of the embodiment of the present invention.
Figure 6A:
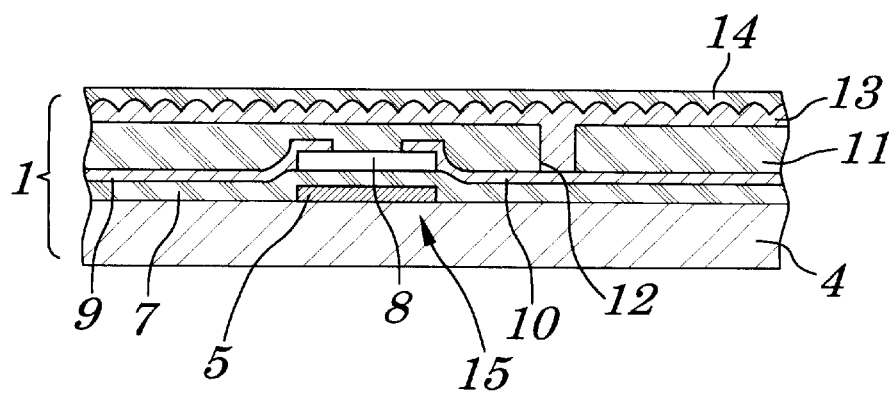
FIGS. 6A, 6B, and 6C are process diagrams illustrating a method of manufacturing, in order of processes, the reflective-type LCD of the embodiment of the present invention.
Figure 6B:
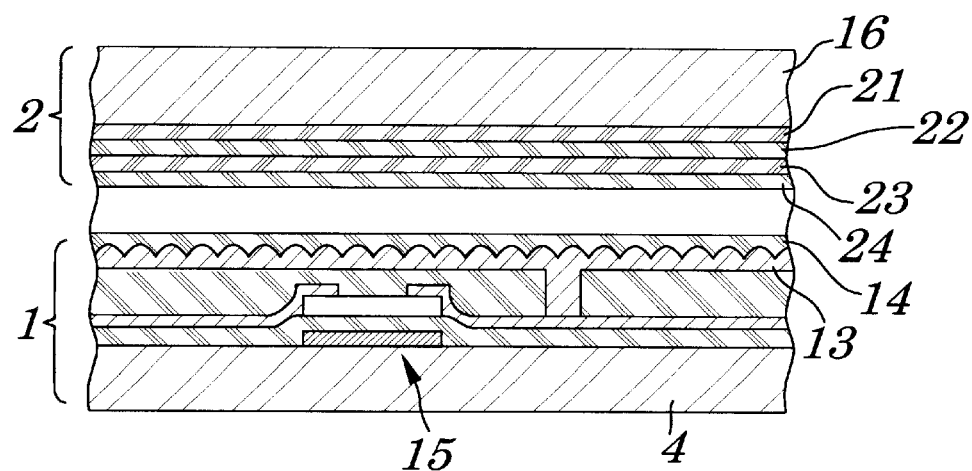
Figure 6C:
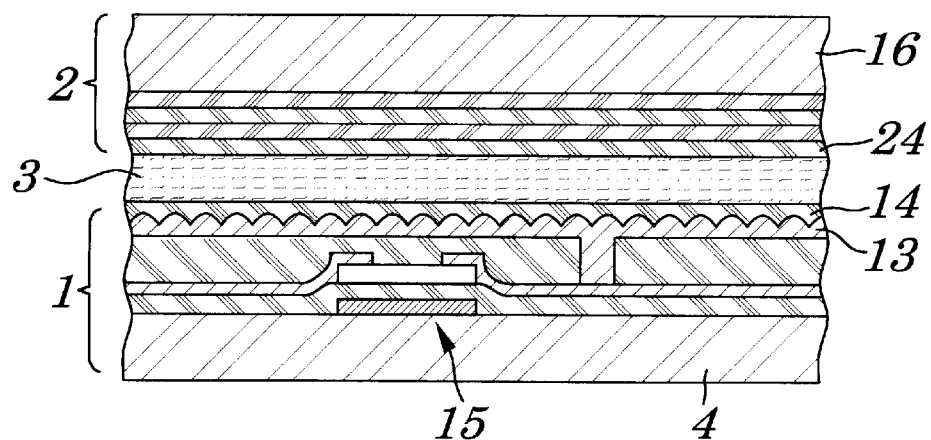
Figure 7:
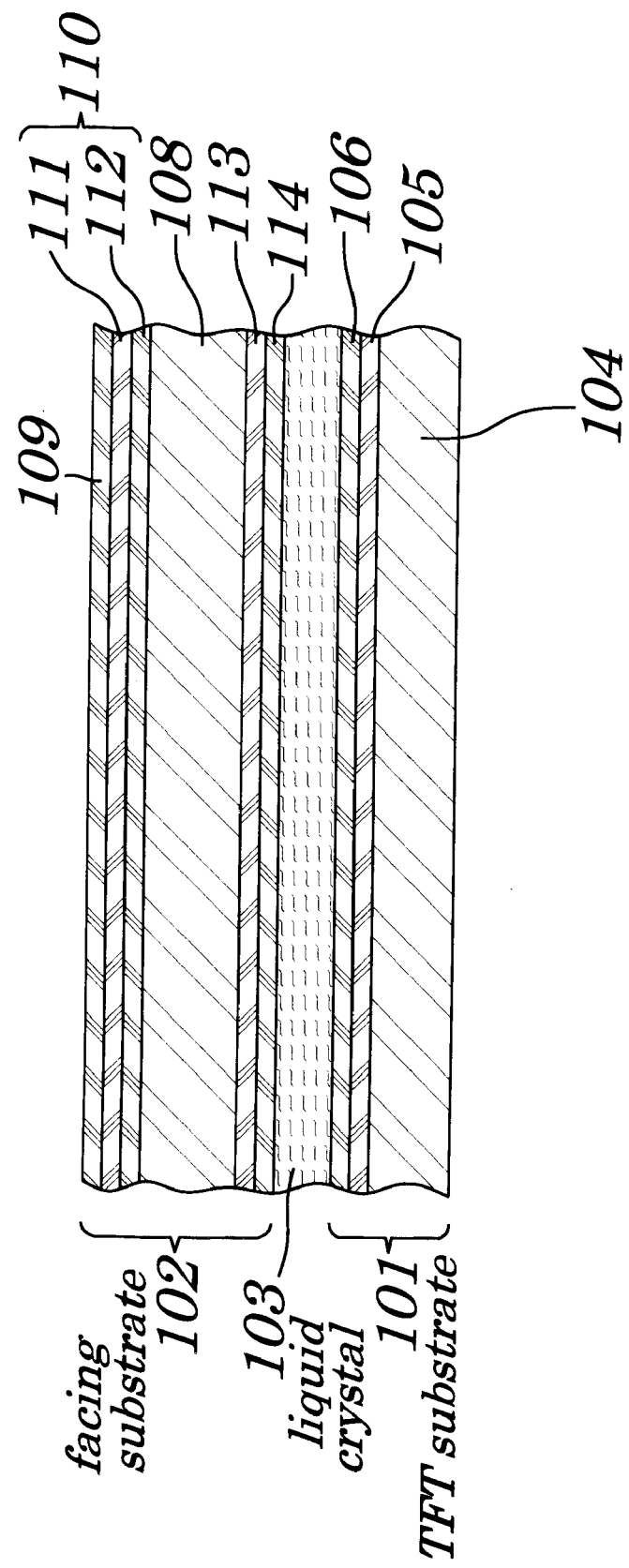
FIG. 7 is a cross-sectional view showing configurations of a conventional reflective-type LCD.

FIG. 1 is a cross-sectional view showing configurations of a reflective-type LCD according to an embodiment of the present invention. FIG. 2 is a schematic diagram illustrating an orientation state of a liquid crystal employed in the reflective-type LCD and angles formed by placement of a polarizer, ½ wavelength phase difference film, and ¼ wavelength phase difference film in the reflective-type LCD of FIG. 1. FIG. 3 is a diagram explaining a result from comparison in effects between the reflective-type LCD of the embodiment and the conventional reflective-type LCD. FIG. 4 is also a diagram explaining a result from comparison in effects between the reflective-type LCD of the embodiment and the conventional reflective-type LCD. FIG. 5 is a diagram explaining effects achieved by the reflective-type LCD of the embodiment of the present invention. FIGS. 6A, 6B, and 6C are process diagrams illustrating a method of manufacturing, in order of processes, the reflective-type LCD of the embodiment of the present invention.

The reflective-type LCD of the embodiment of the present invention, as shown in FIG. 1, includes a TFT substrate 1 on which a TFT 15 operating as a driving element is formed, a facing substrate 2, and the liquid crystal 3 sandwiched between the TFT substrate 1 and the facing substrate 2 and driven by the TFT 15.

The TFT substrate 1, as shown in FIG. 1, is made up of a first transparent insulating substrate 4 made from glass or a like, a gate electrode 5 made from aluminum, an aluminum alloy, or a like formed on a side of the liquid crystal 3 on the first transparent insulating substrate 4, a gate insulating film 7 made from silicon nitride or a like formed on the gate electrode 5, a semiconductor layer 8 made from noncrystalline silicon or a like formed at a place above the gate electrode 5 on the gate insulating film 7, a drain electrode 9 and a source electrode 10 both drain electrode 9 and source electrode 10 being made from chromium or a like drawn out from each of ends of the semiconductor layer 8, a protection film 11 made from silicon nitride or a like and formed in a manner so as to cover the drain electrode 9, semiconductor layer 8, and source electrode 10, a reflective electrode 13 made from aluminum or aluminum alloy or a like drawn from the source electrode 10 through a contact hole 12 formed in the protection film 11 and operating as a pixel electrode and also serving as a reflective plate, and a first oriented film 14 made from polyimide resin or a like formed in a manner so as to cover the reflective electrode 13. The gate electrode 5, gate insulating film 7, semiconductor layer 8, drain electrode 9, source electrode 10 make up the TFT 15.

The facing substrate 2 is made up of a second transparent insulating substrate 16, a polarizer 17 formed on a side opposite to the liquid crystal 3 on the second transparent insulating substrate 16, a layer-stacked type ¼ wavelength plate 18 constructed by combining the ½ wavelength phase difference film 19 and the ¼ wavelength phase difference film 20 both being made from a norbornene polymer such as Arton™ (product name) or a like being a highly heat-resistant insulating material formed between the polarizer 17 and the second transparent insulating substrate 16, a color filter 21 formed on a side of the liquid crystal 3 on the second transparent insulating substrate 16, a planarized film 22 made from an acrylic polymer and formed in a manner so as to cover the color filter 21, a common electrode 23 made up of a transparent conductor such as Indium-Tin-Oxide (ITO) formed in a manner so as to cover the planarized film 22 and a second oriented film 24 made from a polyimide resin or a like and formed in a manner so as to cover the common electrode 23 and to be in contact with the liquid crystal 3.

The norbornene polymer Arton™, since it is more excellent in heat-resistance compared with a polycarbonate polymer or a polysulfone polymer, can withstand exposure to an atmosphere of a high temperature. As the liquid crystal 3, the TN type liquid crystal is used and its twisted angle is set as described later.

A surface of the reflective electrode 13 serving also as a reflective plate, as shown in FIG. 1, is formed so as to have tiny bumps and dips. This causes light incident to the reflective electrode 13 from a side of the facing substrate 2 to have an appropriate scattering characteristic and therefore it is made possible to improve reflective efficiency.

A direction of orientation of a liquid crystal molecule in the liquid crystal 3 is determined by orientation processing to be performed on the first oriented film 14 and second oriented film 24 and the liquid crystal molecules are oriented so as to be serially twisted between the TFT substrate 1 and the facing substrate 2. To achieve a specified orientation state in the liquid crystal 3, well-known rubbing processing is performed on surfaces of the first oriented film 14 and second oriented film 24.

As shown in FIG. 2, a light absorbing axis A of the polarizer 17, an optical axis B of the ½ wavelength phase difference film 19, and an optical axis C of the ¼ wavelength phase difference film 20 are set. An orientated direction D on the side of the facing substrate 2 in the liquid crystal 3 is used as a reference direction (reference for angles to be formed). Moreover, an oriented direction E on the side of the TFT substrate 1 in the liquid crystal 3 is also set. A twisted direction of the liquid crystal 3 occurring when the liquid crystal 3 is traced from the side of the facing substrate 2 to the side of the TFT substrate 1 relative to the oriented direction D on the side of the facing substrate 2 on the liquid crystal 3 is defined as being "positive" and an angle "α" formed by the light absorbing axis A of the polarizer 17 and by the oriented direction D, an angle "β" formed by the optical axis B of the ½ wavelength phase difference film 19 and by the oriented direction D, and an angle "γ" formed by the optical axis C of the ¼ wavelength phase difference film 20 and by the oriented direction D are set as follows.

That is, the above angle "α" is set to be within a range of 31 degrees to 41 degrees and preferably to be 36 degrees, the above angle "β" is set to be within a range of 17 degrees to 27 degrees and preferably to be 22 degrees and the above angle "γ" is set to be within a range of −34 degrees to −24 degrees and preferably to be −29 degrees. Moreover, a twisted angle of the liquid crystal 3 employed in the embodiment is set to be within a range of 66 degrees to 74 degrees and preferably to be 72.5 degrees, and a product "Δ nd" of a refractive index anisotropy of the liquid crystal 3 and a thickness of a layer of the liquid crystal 3 is set to be 0.21 μm to 0.31 μm. Moreover, permitivity anisotropy of the liquid crystal 3 is set to be about 6 degrees or more and preferably to be within a range of 6 degrees to 14 degrees.

In the reflective-type LCD of the embodiment, as described above, since the layer-stacked ¼ wavelength plate 18 constructed by combining the ½ wavelength phase difference film 19 and the ¼ wavelength phase difference film 20, both being made from a norbornene polymer such as the Arton™ (trade name), is formed between the polarizer 17 and the second transparent insulating substrate 16 on the side opposite to the liquid crystal 3 on the facing substrate 2 and since the above Arton™ exhibits great wavelength dispersion in anisotropy of the refractive index in a visible light region, it is possible to prevent unwanted colors from developing when a black color is displayed.

FIG. 3 is the diagram explaining the result from comparison in effects between the reflective-type LCD of the embodiment using the Arton™ indicated by a curve "b" and the conventional reflective-type LCD using a polycarbonate polymer indicated by a curve "a". The curve "a" indicates a relation between the ratio of wavelength dispersion and the wavelength occurring when the Arton™ being the norbornene polymer is used as the material for each of the phase difference film, ½ wavelength phase difference film 19 and ¼ wavelength phase difference film 20. Moreover, Tables 1 and 2 show comparisons in the ratio of the wavelength dispersion corresponding to an arbitrary wavelength "λ" between the polycarbonate polymer and Arton™ For example, in Table 1, if the Arton™ is used, the ratio of wavelength dispersion corresponding to the wavelength being 500 nm is 1.006.

As is apparent from FIG. 3 and Tables 1 and 2, the curve "b" shows that, even in a region in which the wavelength is small, the ratio of wavelength dispersion is smaller than that showed by the curve "a", which indicates that the Arton™ has the small wavelength dispersion in anisotropy of the refractive index. This also indicates that, in a region of blue light having a wavelength of, for example, about 430 nm, retardation is small and therefore the blue light does not leak even when a black color is displayed, resulting in reduction in occurrence of the development of blue color. Therefore, when the black color is to be displayed, faithful display of the black color is achieved and unnatural display can be avoided accordingly.

Moreover, as shown in an XY chromaticity diagram in FIG. 4, a chromaticity region "b" surrounded by red (R), green (G), and blue (B) colors in the embodiment spreads more compared with the case of the chromaticity region "a" in the conventional example. Moreover, an "x" coordinate of the black color is about 0.249 and its "y" coordinate is about 0.282, both being larger than those in the conventional case. For these reasons, according to the embodiment, development of a bluish black color can be avoided.

According to the reflective-type LCD of the embodiment, as described above, even if the twisted angle of the liquid crystal 3 is set as in the conventional example and even if the product "Δ nd" of the refractive index anisotropy (angle) of the liquid crystal 3 and the thickness of the layer of the liquid crystal 3 is set also as in the conventional example, by placing the polarizer 17 so that the angle "α" formed by its polarized light absorbing axis and by an oriented direction is set to be within a range of 31 degrees to 41 degrees, by placing the ½ wavelength phase difference film 19 so that the angle "β" formed by its optical axis and by the oriented direction D is set to be within a range of 17 degrees to 27 degrees and by placing the ¼ wavelength phase difference film 20 so that the angle "γ" by its optical axis and by the oriented direction D is set to be within a range of −34 degrees to −24 degrees, and by setting the permitivity anisotropy of the liquid crystal 3 to be about 6 degrees or more, it is possible to stably obtain high contrast in the display.

FIG. 5 is a diagram explaining a relation between the contrast (ordinate) obtained by a simulation and the permitivity anisotropy (abscissa) obtained also by the simulation. In FIG. 5, characteristics are shown which are calculated using driving voltages as parameters and the curve "a" is the characteristic occurring when the driving voltage is set to be 4 V, a curve "b" is the characteristic occurring when the driving voltage is set to be 5 V, and a curve "c" is the characteristic occurring when the driving voltage is set to be 6 V. The permitivity anisotropy Δε can be calculated by a following equation:

$$\Delta\epsilon = \epsilon 1 - \epsilon 2$$

where ε1 denotes permitivity obtained by applying a voltage of about 10 V to the liquid cell and where ε2 denotes permitivity obtained by applying a voltage of about 0.1 V to the liquid cell. Moreover, the twisted angle being a liquid cell parameter is set to be 90 degrees and a cell gap also being the liquid cell parameter is set to be 5 μm.

As is apparent from FIG. 5, at any voltage, as the permittivity anisotropy Δε increases, the contrast becomes high and characteristics indicated by each of the curves "a" to "c" change in a linear manner. Therefore, it is possible to stably obtain high contrast without causing the increase of the driving voltage. For example, when the driving voltage is 5 V, by setting the permittivity anisotropy Δε to be about 6, the contrast being 40 (contrast ration 40:1) can be obtained and by setting the permittivity anisotropy Δε to be about 9, the contrast being 80 can be obtained. Thus, by realizing the contrast being about 40 or more, a sufficiently practical reflective-type LCD can be achieved. Moreover, if the permittivity anisotropy Δε increases too much, a factor that affects adversely the liquid crystal 3 occurs, and therefore, to make larger the permittivity anisotropy Δε is not always effective. According to an experiment by the inventor, if the permittivity anisotropy Δε is up to about 14, the reflective-type LCD that can be used practically can be manufactured successfully. To increase the permittivity anisotropy Δε, components containing a polar group such as carbon, nitrogen, iron or a like in the liquid crystal 3 are increased basically.

Next, a method for manufacturing the reflective-type LCD is described in order of processes by referring to FIGS.

6A, 6B, and 6C. First, as shown in FIG. 6A, after a metal film made from aluminum, aluminum alloy, or a like is formed by a sputtering method or a like on all surfaces of a side of the liquid crystal 3 to be injected by a method described later existing on the first transparent insulating substrate 4 made from glass or a like, patterning is performed on the metal film by known photolithography to form a desired shaped gate electrode 5.

Next, on all surfaces of the transparent insulating substrate 4 and of the gate electrode 5, the gate insulating film 7 made from silicon nitride is formed by a Chemical Vapor Deposition (CVD) method or a like. Then, after noncrystalline silicon is formed on all surfaces of the gate insulating film 7 by the CVD method, patterning is performed on the noncrystalline silicon by the photolithography to form the semiconductor layer 8 at a place above the gate electrode 5 on the gate insulating film 7. Then, after the metal film made from chromium is formed, by the sputtering method, on all surfaces of the semiconductor layer 8 and on the gate insulating film 7, patterning is performed on the metal film by the photolithography to form the drain (prior was drain 9) electrode 9 and source (prior was source 10) electrode 10. Then, an insulating film made from silicon nitride is formed, by the CVD method, on all surfaces of the semiconductor layer 8, drain (prior was drain 9) electrode 9 and source (prior was source 10) electrode 10 to form the protection film 11. The protection film 11 is formed to protect the semiconductor layer 8 from an outside atmosphere. Thus, on the first transparent insulating substrate 4 is formed the TFT 15 made up of the gate electrode 5, gate insulating film 7, semiconductor layer 8, drain electrode 9, and source electrode 10.

Next, after the contact hole 12 is formed in the protection film 11, by the photolithography, which causes the source electrode 10 to be partially exposed, a metal film made from aluminum, aluminum alloy, or a like is formed, by the sputtering method, on all surfaces of the protection film 11 and in the contact hole 12, and then patterning is performed on the metal film, by the photolithography, to form the desired shaped reflective electrode 13. Next, after the first oriented film 14 made from a polyimide resin or a like is formed on the reflective electrode 13, rubbing processing is performed on the first oriented film 14 so that the first oriented film 14 is oriented so as to have a twisted angle of a range of 66 degrees to 74 degrees when the liquid crystal 3 has been injected. Thus, the TFT substrate 1 is formed.

Next, as shown in FIG. 6B, after a resist produced by adding red, green, and blue pigments to, for example, an acrylic light sensitive polymer is applied to all surfaces on the side of the liquid crystal 3 on the second transparent insulating substrate 16 made from glass or a like, patterning is performed on the resist by the photolithography to form the color filter 21 at a desired place. Then, an acrylic polymer or a like is applied to the color filter 21 by using a Spin-On-Glass (SOG) method, printing method, or a like to form the planarized film 22. Then, the ITO is formed, by the sputtering method, on all surfaces of the planarized film 22 to form the common electrode 23. Next, the second oriented film 24 made from a polyimide resin or a like is formed on the common electrode 23, rubbing processing is performed on the second oriented film 24 so that the second oriented film 24 is oriented so as to have a twisted angle of from 66 degrees to 74 degrees when the liquid crystal 3 has been injected. Thus, the facing substrate 2 is formed.

Next, as shown in FIG. 6C, the liquid crystal 3 being the TN liquid crystal is injected into space between the TFT substrate 1 and the facing substrate 2 through a spacer (not shown) in a manner that the liquid crystal 3 is in contact with the first oriented film 14 and with the second oriented film 24. The liquid crystal 3 is then oriented, in accordance with rubbing angles formed on the first oriented film 14 and second oriented film 24 in advance by the rubbing processing, so that the twisted angle is set to be within a range of 66 degrees to 74 degrees.

Next, after the layer-stacked type ¼ wavelength plate 18 constructed by combining the ½ wavelength phase difference film 19 with the ¼ wavelength phase difference film 20 is formed on the side opposite to the side being in contact with the liquid crystal 3 on the facing substrate 2, the polarizer 17 is formed to finish the manufacturing of the reflective LCD shown in FIG. 1.

In the method for manufacturing the reflective-type LCD as described above, by a combination of well-known processes in the sputtering, CVD method, photolithography, or a like, without the use of additional special processes, the reflective-type LCD can be manufactured and, therefore, no rise in costs occurs.

Thus, according to the embodiment of the present invention, the reflective-type LCD is so configured that the liquid crystal 3 is sandwiched between the TFT substrate 1 and the facing substrate 2, that the TFT substrate 1 is made up of the first transparent insulating substrate 4, the TFT 15 formed on the side of the liquid crystal 3 on the first transparent insulating substrate 4, the reflective electrode 13 formed on the TFT 15, and the first oriented film 14 formed in a manner so as to cover the reflective electrode 13, that the facing substrate 2 is made up of the second transparent insulating substrate 16, the common electrode 23 constructed of the transparent conductor formed on the side of the liquid crystal 3 on the second transparent insulating substrate 16, the second oriented film 24 formed in a manner so as to cover the common electrode 23, and the polarizer 17 formed on the side opposite to the side being in contact with the liquid crystal 3 on the second transparent insulating substrate 16 with the layer-stacked ¼ wavelength plate 18 constructed by combining the ½ wavelength phase difference film 19 with the ¼ wavelength phase difference film 20, both being made from a norbornene polymer, being sandwiched between the polarizer 17 and the second transparent insulating substrate 16, wherein the twisted direction of the liquid crystal 3 occurring when the liquid crystal 3 is traced from the side of the facing substrate 2 to the side of the TFT substrate 1 on the liquid crystal 3 relative to the oriented direction D, which serves as the reference of the angle to be formed, on the side of the facing substrate 2 on the liquid crystal 3 is defined as being "positive" and the angle "α" formed by the light absorbing axis of the polarizer 17 and by the oriented direction D is set to be from 31 degrees to 41 degrees, the angle "β" formed by the optical axis of the ½ wavelength phase difference film 19 and by the oriented direction is set to be from 17 degrees to 27 degrees, and the angle "γ" formed by the optical axis of the ¼ wavelength phase difference film 20 and by the oriented direction D is set to be from −34 degrees to −24 degrees and the permitivity anisotropy of the liquid crystal 3 is set to be about 6 degrees or more. Therefore, the wavelength dispersion in anisotropy of the refractive index in a visible light region can be made smaller and the contrast can be made higher without causing an increase of the driving voltage.

Moreover, according to the method for the reflective-type LCD of the embodiment of the present invention, by the combination of well-known processes, without the use of additional special processes, the reflective-type LCD can be manufactured and, therefore, no rise in costs occurs.

Furthermore, the development of unwanted colors when a black color is displayed can be avoided and high contrast can be stably obtained.

It is apparent that the present invention is not limited to the above embodiments but may be changed and modified without departing from the scope and spirit of the invention. For example, in the above embodiment, as the liquid crystal driving element serving as the switching element to drive the liquid crystal, the TFT is employed, however, other switching elements such as a Metal Insulator Metal (MIM) diode may be used as the switching element.

Moreover, in the above embodiment, the example is shown in which the switching element is formed on the transparent insulating substrate to form the TFT substrate, however, a semiconductor substrate such as a silicon substrate or a like may be employed instead of the transparent insulating substrate. Also, in the embodiment, the transparent insulating substrate is used as the substrate, however, a general insulating substrate may be employed.

Furthermore, in the embodiment, the color filter is formed on the side of the facing substrate, however, it may be formed on the side of the TFT substrate. The materials for the insulating films, conductive films or a like, conditions for various forming processes or a like applied in the embodiment are only examples and may be changed depending on objects, applications, or a like.

What is claimed is:

1. A reflective-type liquid crystal display for obtaining a desired display comprising:

a liquid crystal;

a liquid crystal driving element forming substrate; and a facing substrate;

wherein said liquid crystal is sandwiched between said liquid crystal driving element forming substrate and said facing substrate, wherein light incident on said liquid crystal from a side of said facing substrate is reflected on a side of said liquid crystal driving element forming substrate and is emitted from a side of said facing substrate so as to be observed, wherein said liquid crystal driving element forming substrate includes an insulating substrate, a liquid crystal driving element formed on a side of said liquid crystal on said insulating substrate, a reflective electrode formed on said liquid crystal driving element, and a first oriented film formed in a manner to cover said reflective electrode wherein said facing substrate includes a transparent insulating substrate, a common electrode comprising a transparent conductor formed on a side of said liquid crystal on said transparent insulating substrate, a second oriented film formed in a manner so as to cover said common electrode, a polarizer formed on a side opposite to a side being in contact with said liquid crystal on said transparent insulating substrate, and a layer-stacked type ¼ wavelength plate including a ½ wavelength phase difference film with a ¼ wavelength phase difference film, both being made from a non polycarbonate polymer, formed between said polarizer and said transparent insulating substrate and wherein a twisted direction of said liquid crystal occurring when said liquid crystal is traced from a side of said facing substrate to a side of said liquid crystal driving element forming substrate relative to an oriented direction, which serves as a reference of an angle to be formed, on a side of said facing substrate on said liquid crystal is defined as being "positive" and an angle "α" formed by a light absorbing axis of said polarizer and by said oriented direction is set to be within a range of 31 degrees to 41 degrees, an angle "β" formed by an optical axis of said ½ wavelength phase difference film and by said oriented direction is set to be within a range of 17 degrees to 27 degrees, and an angle "γ" formed an optical axis of said ¼ wavelength phase difference film and by said oriented direction is set to be within a range of −34 degrees to −24 degrees and permitivity anisotropy of said liquid crystal is set to be about 6 degrees or more.

2. The reflective-type liquid crystal display according to claim 1, wherein said permittivity anisotropy of said liquid crystal is set to be within a range of 6 to 14.

3. The reflective-type liquid crystal display according to claim 1, wherein said twisted angle of said liquid crystal is set to be from 66 degrees to 74 degrees and a product of anisotropy of refractive index of said liquid crystal and a thickness of a layer of said liquid crystal is set to be within a range of 0.21 μm to 0.31 μm.

4. The reflective-type liquid crystal display according to claim 1, wherein said ½ wavelength phase difference film and said ¼ wavelength phase difference film are made from a material exhibiting small wavelength dispersion in anisotropy of refractive index in a visible light region.

5. The reflective-type liquid crystal display according to claim 1, wherein said reflective electrode includes bumps and dips on its surface.

6. The reflective-type liquid crystal display according to claim 1, wherein said non polycarbonate polymer comprises norbornene polymer.

7. The reflective-type liquid crystal display according to claim 1, wherein said permittivity anisotropy of said liquid crystal is set to be within a range of 6 to 14, wherein said twisted angle of said liquid crystal is set to be from 66 degrees to 74 degrees and a product of anisotropy of refractive index of said liquid crystal and a thickness of a layer of said liquid crystal is set to be within a range of 0.21 μm to 0.3 μm, and wherein said ½ wavelength phase difference film and said ¼ wavelength phase difference film are made from a material exhibiting small wavelength dispersion in anisotropy of refractive index in a visible light region.

8. The reflective-type liquid crystal display according to claim 7, wherein said reflective electrode includes bumps and dips on its surface.

9. A method for manufacturing a reflective-type liquid crystal for obtaining a desired display by forming a liquid crystal between a liquid crystal driving element forming substrate and a facing substrate and by causing light incident on said liquid crystal from a side of said facing substrate to be reflected on a side of said liquid crystal driving element forming substrate and to be emitted from a side of said facing substrate so as to be observed, said method comprising:

forming said liquid crystal driving element forming substrate comprising a liquid crystal driving element, a reflective electrode, and a first oriented film formed respectively on an insulating substrate;

forming said facing substrate in which a common electrode including a transparent conductor and a second oriented film on a side opposite to said insulating substrate on a transparent insulating substrate are provided;

injecting said liquid crystal between said liquid crystal driving element forming substrate and said facing substrate so that said liquid crystal comes into contact with said first and second oriented films and causing said liquid crystal to be oriented, in accordance with a rubbing angle formed in advance on said first and second oriented films, so that a twisted angle is set to be within a range of 66 degrees to 74 degrees and that a product of anisotropy of refractive index of said liquid crystal and a thickness of a layer of said liquid crystal is set to be within a range of 0.21 μm to 0.31 μm; and forming a polarizer on a side opposite to a side being in contact with said liquid crystal on said facing substrate with a layer-stacked type ¼ wavelength plate including a ½ wavelength phase difference film and a ¼ wavelength phase difference film, both comprising a non polycarbonate polymer;

wherein, in said liquid crystal injecting, said liquid crystal is injected such that a twisted direction of said liquid crystal occurring when said liquid crystal is traced from a side of said facing substrated to a side of said liquid crystal driving element forming substrate relative to an oriented direction, which serves as a reference of an angle to be formed, on a side of said facing substrated on said liquid crystal is defined as being "positive" and angle "α" formed by a light absorbing axis of said polarizer and by said oriented direction is set to be within a range of 31 degrees to 41 degrees.

10. The method for manufacturing the reflective-type liquid crystal according to claim 9, wherein, in said liquid injecting, an angle "β" formed by an optical axis of said ½ wavelength phase difference film and by said oriented direction is set to be within a range of 17 degrees to 27 degrees, and an angle "γ" formed by an optical axis of said ¼ wavelength phase difference film and by said oriented direction is set to be within a range of −34 degrees to −24 degrees and permittivity anisotropy of said liquid crystal is set to be about 6 or more.

11. The method for manufacturing the reflective-type liquid crystal according to claim 10, wherein said liquid crystal having permittivity anisotropy within a range of 6 to 14 is used.

12. The method for manufacturing the reflective-type liquid crystal according to claim 9, wherein, in said polarizer forming process, said non polycarbonate polymer, comprises norbornene polymer.

* * * * *